US012629977B2

(12) United States Patent
Bellan

(10) Patent No.: US 12,629,977 B2
(45) Date of Patent: May 19, 2026

(54) AIR SUPPLY ASSEMBLY FOR VEHICLE TRAILERS HAVING MOVEABLE TANDEM AXLES, METHOD OF USE, AND TRAILER WITH AIR SUPPLY ASSEMBLY

(71) Applicant: Bellan LLC, Franklintown, PA (US)

(72) Inventor: Eric Bellan, Franklintown, PA (US)

(73) Assignee: BELLAN LLC, Franklintown, PA (US)

( * ) Notice: Subject to any disclaimer, the term of this patent is extended or adjusted under 35 U.S.C. 154(b) by 512 days.

(21) Appl. No.: 18/130,538

(22) Filed: Apr. 4, 2023

(65) Prior Publication Data
US 2024/0336098 A1 Oct. 10, 2024

(51) Int. Cl.
*B60G 11/27* (2006.01)

(52) U.S. Cl.
CPC ........ *B60G 11/27* (2013.01); *B60G 2202/152* (2013.01); *B60G 2204/201* (2013.01); *B60G 2204/4702* (2013.01)

(58) Field of Classification Search
CPC .............. B60G 11/27; B60G 2204/201; B60G 2204/4702; B60G 2202/152
See application file for complete search history.

(56) References Cited

U.S. PATENT DOCUMENTS

| | | | |
|---|---|---|---|
| 1,613,086 A | 1/1927 | Floyd | |
| 3,133,651 A | 5/1964 | Cripe | |
| 4,240,647 A | 12/1980 | Lewis | |
| 4,634,151 A | 1/1987 | Holt | |
| 5,069,471 A | * 12/1991 | Van Der Linden | ....... B60P 3/32 296/157 |
| 5,346,290 A | 9/1994 | Orcutt | |
| 11,560,188 B2 | 1/2023 | Moore et al. | |
| 11,999,206 B2 | * 6/2024 | Lacaze | .................... B60D 1/62 |
| 12,077,026 B2 | * 9/2024 | Ieradi | ....................... B60D 1/44 |
| 2013/0038043 A1 | 2/2013 | Brown et al. | |

(Continued)

FOREIGN PATENT DOCUMENTS

| | | | | |
|---|---|---|---|---|
| CN | 210436944 U | * | 5/2020 | |
| DE | 3806568 A1 | * | 10/1988 | ............... B60D 1/44 |
| DE | 102019135232 A1 | * | 6/2021 | ............... B60D 1/02 |

(Continued)

OTHER PUBLICATIONS

Telescopic cylinder, Wikipedia, Jun. 29, 2022.

*Primary Examiner* — Faye M Fleming
(74) *Attorney, Agent, or Firm* — Millen, White, Zelano & Branigan P.C.; Christopher W. Brody

(57) ABSTRACT

An air supply assembly for a vehicle trailer having a moveable tandem axle assembly includes at least a pair of telescoping tubes that allow air supply to the moveable tandem axle assembly. The telescoping tubes allow air to be supplied to the moveable tandem axle assembly when the moveable tandem axle assembly is in its extended or front trailer position or in its retracted position, wherein the moveable tandem axle assembly is closer to the rear of the trailer. The necessary supporting mechanism(s) are provided to hold the telescoping tubes in place to provide a connection between an air supply line and an input for air supply at the moveable tandem axle assembly and allow for the telescoping movement to account for the movement of the moveable tandem axle assembly while maintain the integrity of the air supply to the moveable tandem axle assembly.

10 Claims, 6 Drawing Sheets

(56)     References Cited

U.S. PATENT DOCUMENTS

2016/0114844  A1     4/2016  Harris
2018/0354326  A1     12/2018  Keatley et al.

FOREIGN PATENT DOCUMENTS

| EP | 0264321  A1 * | 4/1988 | ............. B60D 1/155 |
| JP | 2006-175928 | 7/2006 | |
| WO | WO-2013085545  A2 * | 6/2013 | ............... B60D 1/40 |
| WO | WO-2016099342  A1 * | 6/2016 | .......... F15B 15/1466 |

* cited by examiner

AIR SUPPLY ASSEMBLY FOR VEHICLE TRAILERS HAVING MOVEABLE TANDEM AXLES, METHOD OF USE, AND TRAILER WITH AIR SUPPLY ASSEMBLY

FIELD OF THE INVENTION

An air supply assembly is provided that allows air to be supplied to a moveable tandem axle assembly of a vehicle trailer.

BACKGROUND ART

The use of vehicle trailers with moveable tandem axle assemblies is well known in the transportation industry. With these kinds of moveable tandem axle assembly, the assembly can be positioned toward the rear of the trailer or in a forward position. The positions can be dictated by various states for turning radius and bridge laws. In addition, customers receiving the vehicle trailers may also require that the tandem axle assembly be moved into the fully rear position for loading, unloading and yard jockeying. When the tandem axle assembly is moved from the full rear position to the forward position, the movement distance is typically about 8 feet of travel.

In tandem axle trailers, it is also known that these axles must be supplied with air for various reasons, e.g., braking, air ride systems, and the like. It is common, especially for 48 feet and 53 feet box trailers that employ moveable tandem axle assemblies, to supply the necessary air using air supply lines and spring hangers to hold the air supply lines off of the ground. Since the tandem axle assembly can move up to 8 or so feet, the air supply lines must be sized in length to accommodate the movement of the assembly. With the tandem axle assembly moved into the forward position, there is an excess length of air supply line and the spring hangers hold the excess air supply line length and prevent the lines from touching the ground. When the tandem axle assembly is in the rearward position near the end of the trailer, the spring hangers allow the line to be extended to accommodate the travel of the tandem axle assembly.

However, there is a need for an improved way to supply air to these types of tandem axle assemblies as the current spring hanger configuration has many drawbacks. First, when the spring hangers are stretched to accommodate the movement of the axle, they tend to fail. The spring hangers can also fail when the vehicle is driving down highways that has a lot of bumps. The spring hangers can also get covered in snow and the extra weight can drag down the spring hangers and cause them to fail. If the vehicle is in transit and a failure occurs, roadside assistance is required for a repair and this service can be quite expensive. Finally, if a vehicle should get pulled over by the authorities, e.g., a Department of Transportation inspection, and broken spring hangers are discovered, the driver could be subject to significant fines.

The present invention removes these drawbacks by providing a way to supply air to a moveable tandem axle assembly without the need for spring hangers and in a way that provides a more durable system that efficiently accounts for the change in location of the tandem axle assembly. More particularly, the inventive assembly employs telescoping tubing that provides the necessary air supply to the tandem axle assembly while at the same time accommodating the movement of assembly from the front position to the rear position on the trailer.

While telescoping pneumatic cylinders are known, see www.ergo-help.net, these types of cylinders are typically used for lifting purposes, actuators in machines, and the like, not as a conduit for air supply, wherein the telescoping movement is precipitated by the axle movement, not air supply.

U.S. Pat. No. 5,346,290 to Orcutt, which is incorporated by reference in its entirety herein, provides an improved way to handle the air supply lines for a tandem axle assembly. However, the structure of Orcutt still employs air supply hoses and requires complicated fittings to provide the necessary air supply to the tandem axles, such making such a structure impractical for actual use on a trailer.

SUMMARY OF THE INVENTION

The invention provides an improvement in the air supply lines of a trailer using a moveable tandem axle assembly.

In one embodiment, a telescoping tubing assembly for supplying air to a moveable tandem axle assembly of a vehicle trailer is provided. This assembly includes a pair of telescoping tubes, each telescoping tube comprising a first tube section and a second tube section connected to each other for telescoping movement.

Also provided are means to mounting one of first or second tube sections to the vehicle trailer and the other of the first or second tube section to the tandem axle assembly. Each of the first and second ends are configured to connect to either an air supply output of the vehicle or an air supply input to the tandem axle assembly.

The assembly also includes means for preventing air leakage between a connection between of the first and second tube sections and allowing for telescoping movement. The assembly is such that the means for mounting permits the first tube section to retract into the second tube section or extend therefrom with movement of the moveable tandem axle assembly and still maintain the air supply to the moveable tandem axle assembly.

The first and second tube sections can be further characterized as inner and outer tubes. In one embodiment, the first tube section is an inner tube of the telescoping tube and the first tube section is configured to connect to an air supply of the vehicle. In another embodiment, the first tube section can be the outer tube of the telescoping tube and the first tube section is configured to connect to the air supply output of the vehicle.

In an embodiment of the invention, when the first tube section is an inner tube of the telescoping tube, the means for mounting the inner tube to the vehicle trailer can be a bracket connected to both the inner tube and the vehicle trailer to support the inner tube and allow for movement of the second tube section. In an alternative embodiment, when the first tube section is an outer tube of the telescoping tube, the means for mounting the outer tube to the vehicle trailer can be a bracket connected to both the outer tube and the vehicle trailer to support the outer tube and allow for movement of the second tube section.

A means for wiping an outer surface of the inner tube can be employed so as not to allow dirt or debris to comprise the sliding or telescoping connection between the two tubes.

The invention also entails of method of using the telescoping tubing assembly by mounting the assembly onto a trailer and one of the ends of the assembly to the air supply lines of the trailer and the other end of the assembly to the moveable tandem axle for air supply thereto. With this mounting the tubes of the telescoping assembly can telescope and accommodate the travel of the tandem axle assembly between the forward and rear positions.

The invention further comprises the combination of a trailer having a moveable tandem axle assembly and moveable air supply lines that accommodate movement of one or more of the axles of the assembly. The trailer is improved by the mounting of the inventive air supply assembly having the telescoping tubing in place of the conventional supports of the air supply lines like spring hangers.

DETAILED DESCRIPTION OF THE INVENTION

The invention provides significant advantages in the field of trailers that use tandem axle assemblies that require movement due to various state and federal regulations and customer requirements. All of the problems associated with spring hangers to support the length of air supply lines that is need to accommodate the tandem axle assemblies being in the rearward position can be alleviated with the inventive telescoping tubing assembly.

Figure 1:
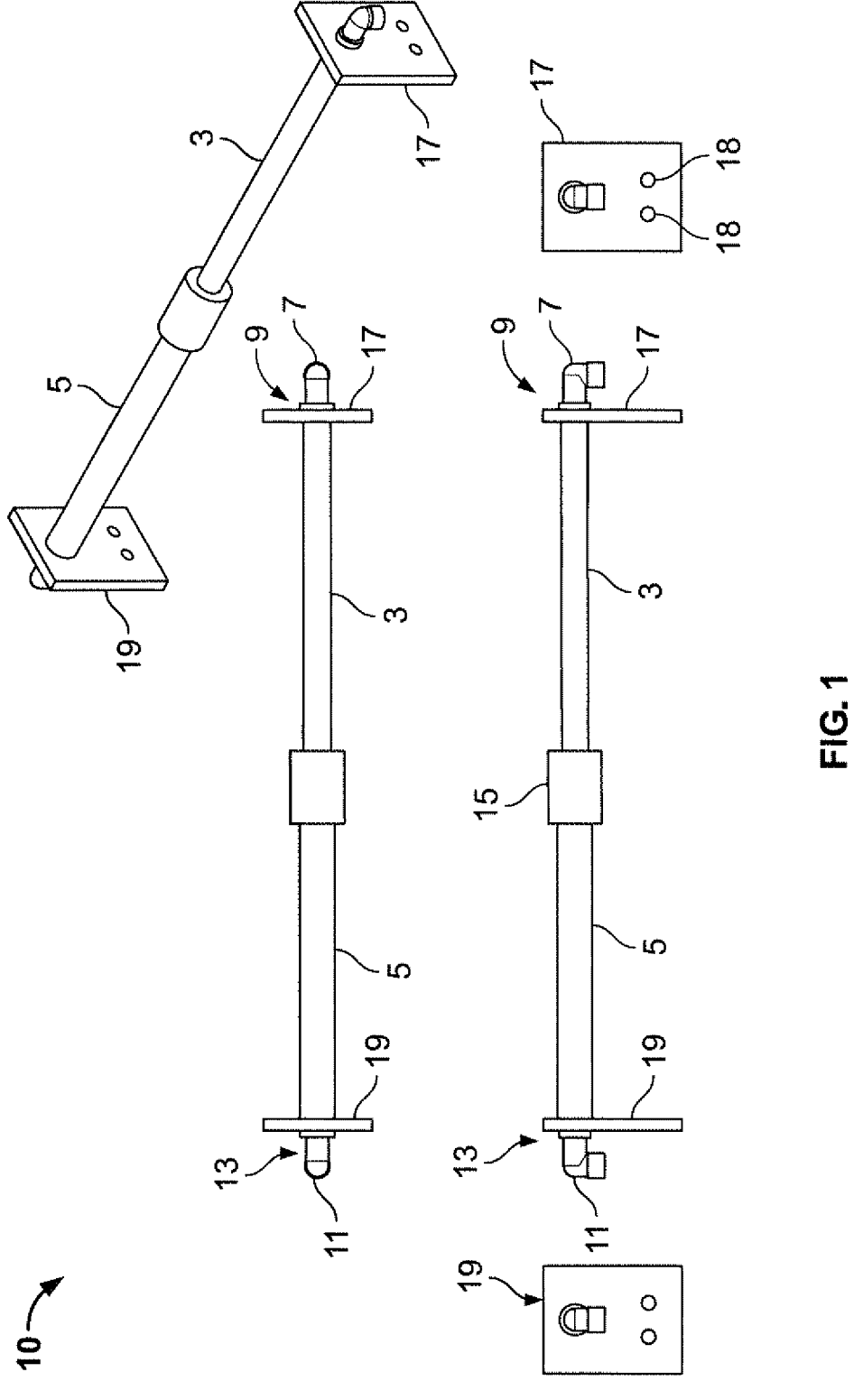
FIG. 1 shows drawings of different views of one of the pair of telescoping tubing of the inventive assembly in an extended state.

Referring now to FIGS. 1-5, a first embodiment of the invention is shown, with other embodiments discussed below. FIG. 1 shows an example of one of the telescoping tubing assemblies, which is designated by reference numeral 10. The telescoping tubing 1 includes an inner tube 3 or first tubing section (hereinafter inner tube) and an outer tube or second tubing section 5 (hereinafter outer tube 5). The inner tube is shown with a fitting 7 on an inner tube end 9. Similarly, the outer tube 5 is shown with a fitting 11 on an outer tube end 13.

The telescoping tubing assembly 10 includes a collar 15, which functions to allow the sliding/telescoping movement of the inner and outer tubes 3, 5 using bearings or the like. The collar 15 allows a sealing to prevent air leakage during sliding movement of the tubes by seals in the collar 15. Optionally, the collar 15 could also include a means to wipe the outer surface of the inner tube 3 during retraction thereof into the outer tube 5. This wiping function can remove debris, dirt, or other unwanted material from entering the confines of the collar 15 and inner space of the outer tube 5 and avoid comprising the sliding capability of the tubes 3 and 5. More details of the collar 15 and means to allow the telescoping action, prevent air leakage, and, optionally a wiping or cleaning function of the outer surface of the inner tube are provided below.

Figure 2:
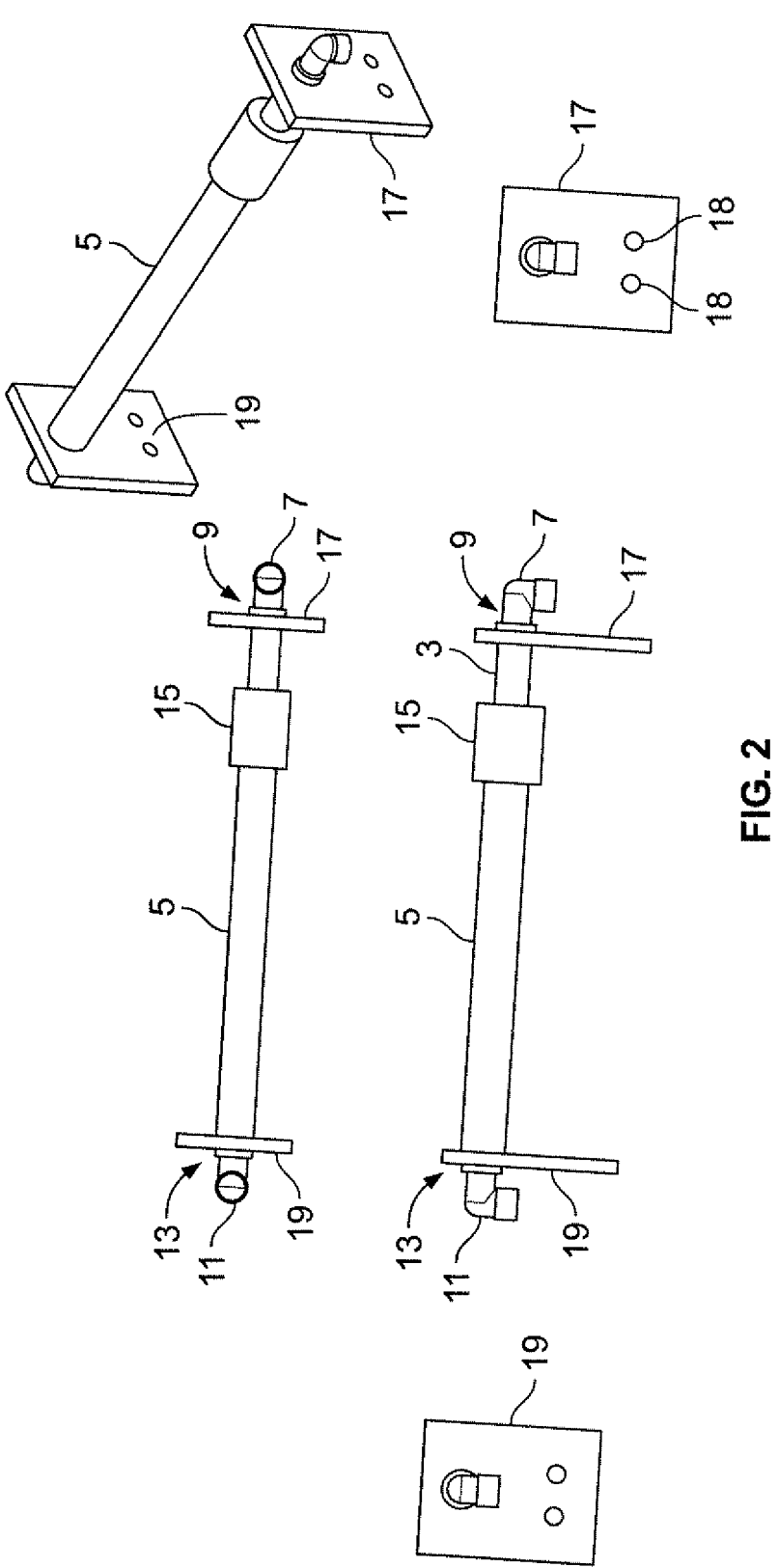
FIG. 2 shows drawings of different view of the telescoping tubing of FIG. 1 in a retracted state.

Also included as part of the telescoping tubing assembly 10 as shown in FIGS. 1 and 2 are means for mounting the telescoping tubing to both a trailer and the tandem axle assembly of the trailer (not shown). In one embodiment, brackets are used for the attachment of the telescoping tubing in the proper locations. More specifically, the inner tube 3 includes a bracket 17 that is secured at or near the end 9 of the inner tube 3. The securing can be welding, mechanical fastening, a combination of both or the like. In one mode of attachment, the bracket 17 also is shown with a pair of openings 18 that allow for attachment to the trailer or the tandem axle assembly using mechanical fastening. It should be understood that the bracket 17 is but one example of a means for attaching the inner tube to the tandem axle assembly or trailer and any other kind fastening means could be used as would be known in the art.

Still referring to FIG. 1 and the first embodiment, another bracket 19 is provided, similar to the bracket 17. The bracket 19 is attached at or near the end 13 of the outer tube 5. In this first embodiment, the bracket 19 would be attached to the tandem axle assembly so that the outer tube 5 would move when the tandem axle assembly moves. The bracket 17 would be attached to the trailer so that the inner tube 3 remains stationary as the outer tube 5 moves with respect to the inner tube 3. As described in more detail below, the inner and outer tubes could be reversed such that the outer tube is stationary and the inner tube moves with the tandem axle assembly.

FIG. 1 shows views of the telescoping tubing 10 in the extended state such that the tandem axle assembly would be positioned at the rear of the trailer.

FIG. 2 shows the same views of the telescoping tubing 10 in FIG. 1 but with the inner tube 3 positioned within the outer tube 5, wherein the tandem axle assembly would be in the forward position.

Figure 3:
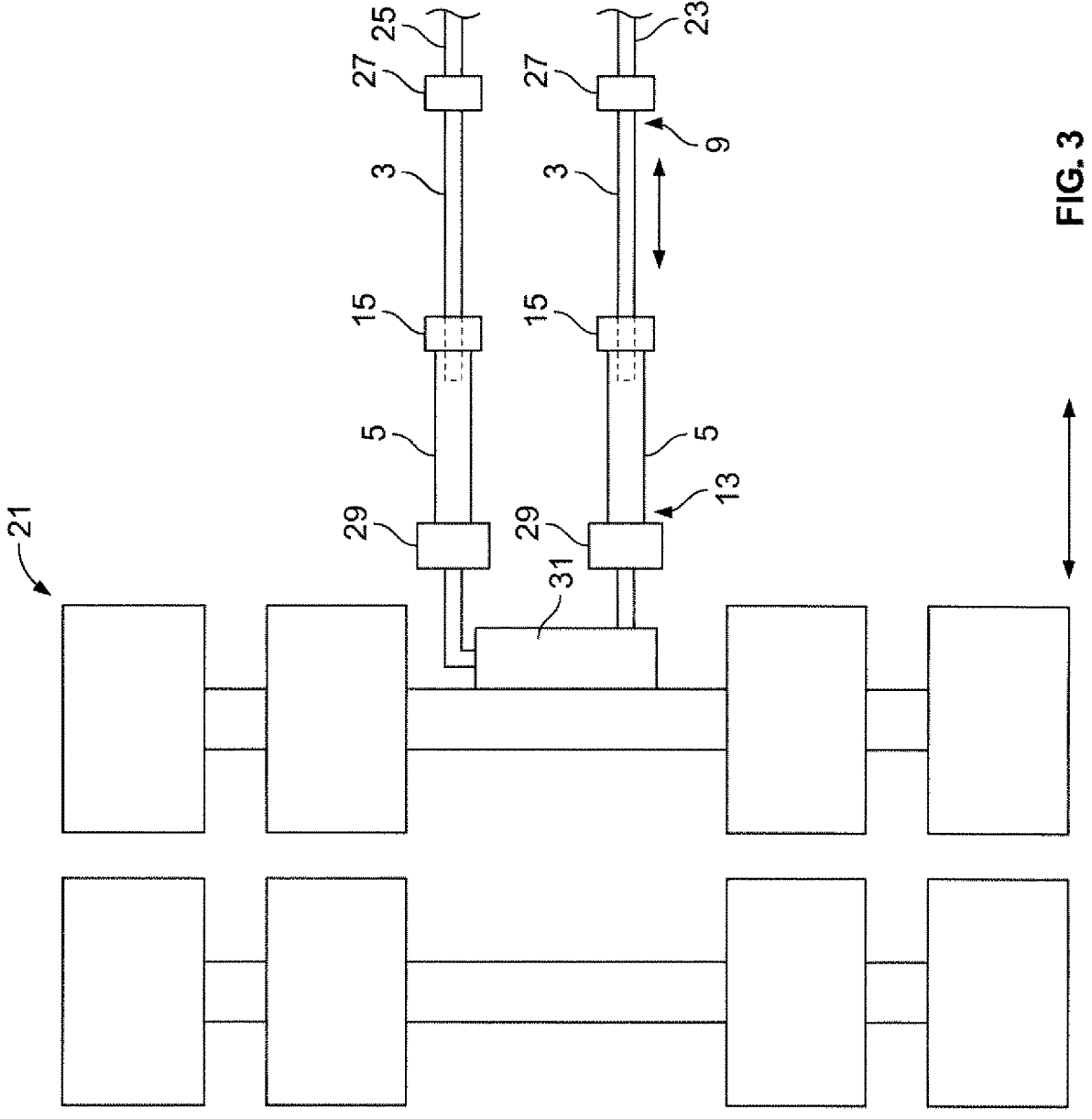
FIG. 3 shows a schematic drawing of a pair of the telescoping tubing assembly of FIG. 1 in application with a tandem axle assembly.

FIG. 3 shows another schematic with a pair of telescoping tubing assemblies 10 in use with a tandem axle assembly 21. As is conventional with these types of trailers, there are two air supply lines 23 and 25 for the tandem axle assembly 21 so that two telescoping tubing assemblies 10 are employed for trailer functionality. One of the pair of telescoping tubing assemblies is linked to air supply line 23 and the other of the pair of telescoping tubing assemblies is linked to the other air supply line 25.

The air supply lines are conventional on these kinds of trailers, wherein air is supplied by a compressor and other component parts of the air supply system located on the tractor (not shown). Since this air supply is conventional for tandem axle trailers like those related to the invention, a further description of the air supply system is not needed for understanding of the invention.

FIG. 3 also shows schematically a connection 27 between each end 9 of the inner tube 3 and the air supply lines 23 and 25. This connection 27 represents means to connect the end 9 of the inner tube 3 and the air supply lines 23 and 25 so that air can be supplied through the telescoping tubing assemblies 10 and to the tandem axle assembly 20. Any known kinds of fittings or couplings can be employed to establish the connection 27 as would be known in the art. Typically, the fittings and couplings used with the telescoping tubing assembly are the same kinds of couplings used elsewhere on the trailer and/or tractor, e.g., Department of Transportation (DOT) compliant tubing and couplings. Since these kinds of tubing and couplings are well known in the trucking industry, a further description of their details is not needed for understanding of the invention. Likewise, each connection between the air supply system, which is designated by reference numeral 31, and the end 13 of each outer tube 5 is designated by reference numeral 29. Like the connection between the air supply lines 23 and 25 and ends 9 of the inner tubes 3, any known connection can be employed to link the air supply system associated with the tandem axle assembly 20 and the ends 13 of the outer tubes 5. The components of the air supply system of the tandem axle assembly 20 are also well known in the art so that a detailed description of the specific components and work- ings is not required for understanding of the invention.

Figure 4:
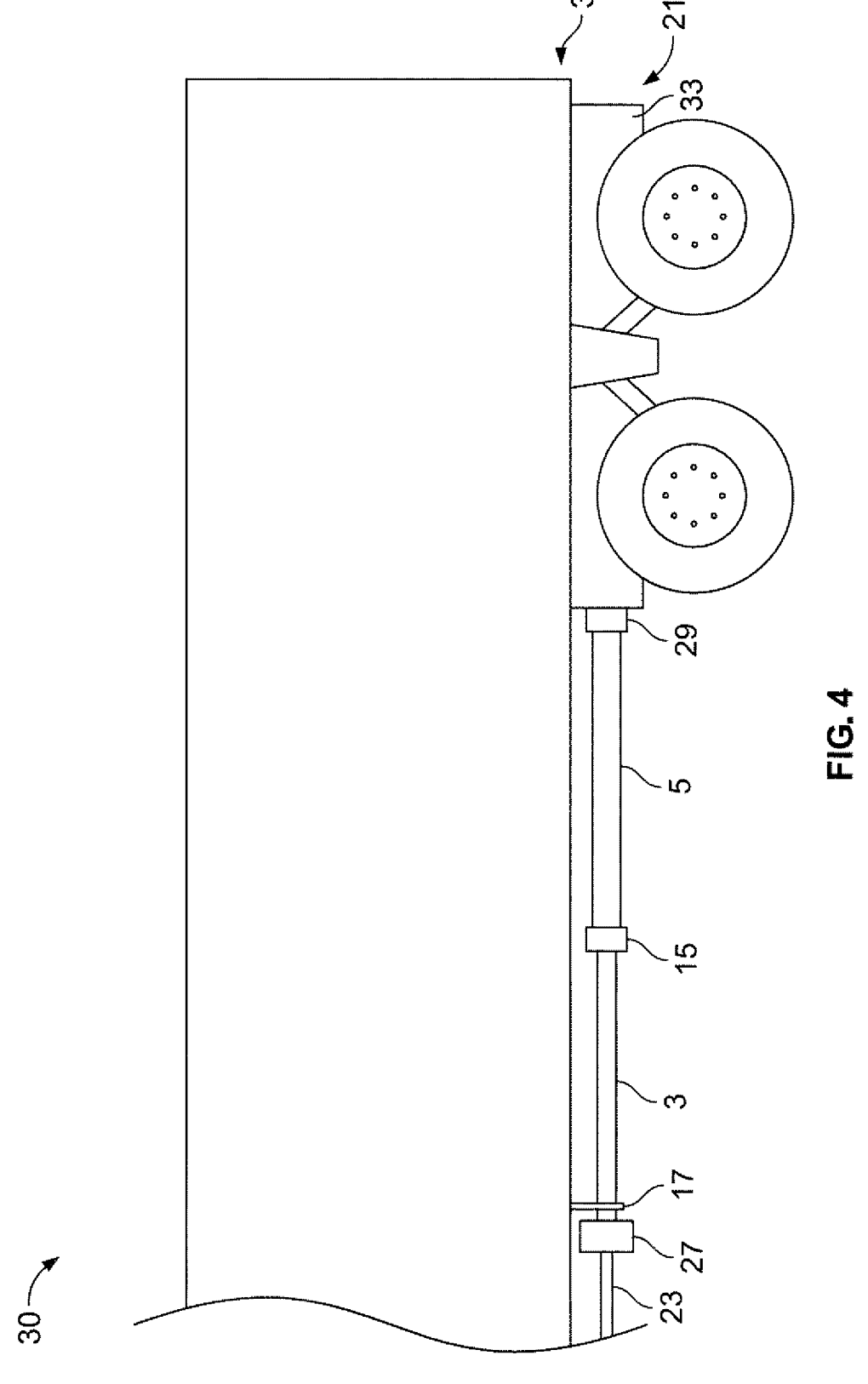
FIG. 4 shows a schematic drawing one of the telescoping tubing assemblies in an extended state in use in a tandem axle assembly trailer.
Figure 5:
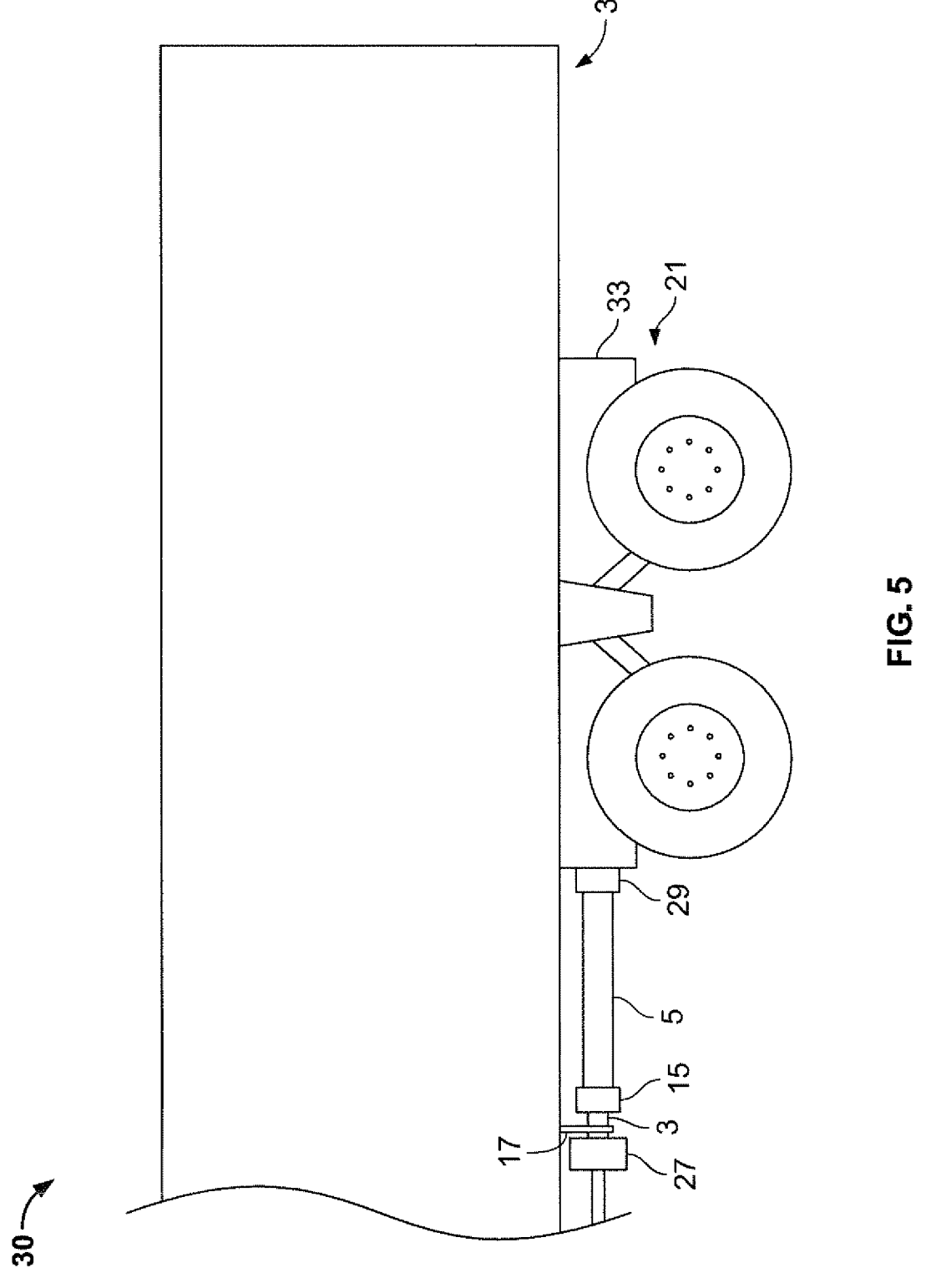
FIG. 5 shows a schematic drawing similar to FIG. 4, wherein the telescoping tubing is in its retracted state in use in a tandem axle assembly trailer.

Referring now to FIGS. 4 and 5, the movement of the tandem axle assemblies 20 and telescoping tubing assembly 10 is depicted. FIG. 4 shows the tandem axle assembly 20 in the rear position, which is closest to the end 31 of the trailer 30. As is known in the art, the tandem axle assembly is mounted on a frame 33, which is designed to slide with respect to the trailer 30. With the tandem axle assembly 20 in the rear position, the telescoping tubing assembly 10 is in its extended state, wherein the inner tube 3 is extended from the outer tube 5, with only a part of the inner tube 3 remaining in the outer tube 5. The same connection 27 representing the coupling between the inner tube 3 and air supply line is shown in FIGS. 4 and 5. Likewise, the same connection 29 between the air supply system of the tandem axle assembly 20 and outer tube is shown in FIGS. 4 and 5.

In terms of the brackets 17 and 19, the bracket 17 that is associated with the inner tube 3 is shown secured to the trailer, thus immobilizing the inner tube 3 and allowing the outer tube 5 to slide thereover during movement of the tandem axle assembly 21. Although not shown, it should be understood that the bracket 19 associated with the outer tube 5 is linked to the frame 33 of the tandem axle assembly.

In FIG. 5, the tandem axle assembly 21 is moved to the forward position. When this movement occurs, the outer tube 5 slides over the stationary inner tube 3 so that the telescoping tubing assembly 10 is in its compressed state as shown in FIG. 2.

In the first embodiment, the telescoping tubing assembly 10 has a preferred overall length of around 9 to 10 feet. This is because on tandem axle trailers, wherein the tandem axles move between a 53' and 48' trailers, the travel of frame is around 8 feet. On the assumption that a preferred length of the inner tubing that remains in the outer tubing when the inner tubing is in the extended state of the tubing assembly is about 1 foot, a nine-foot assembly length would result in an overall extended state length of about 17 feet, with the extension being about 8 feet. Of course, the telescoping tubing assembly length could vary depending on the par- ticular application and movement of a tandem axle assem- bly, meaning it could be more or less than the preferred 9-10 feet length.

As noted above, the means for mounting the telescoping tubing assembly to the trailer or the tandem axle assembly can involve any number of different mechanical supporting means. A bracket as detailed could be provided that is mechanically fastened to one of the tubing sections that is configured to connect to the air supply of the vehicle and the trailer itself. While the brackets 17 and 19 are shown associated with the tubes, the means for mounting could also employ the fitting or coupling that is part of the connection between the tubes and the air supply lines or air supply system of the tandem axle assembly. As long as one end of the telescoping tubing assembly is ultimately secured to the trailer by an appropriate means and the other end secured to the tandem axle assembly by an appropriate means such that the telescoping tubing assembly can accommodate the movement of the tandem axle assembly between the rear position and the forward position, the aim of the invention can be achieved.

Turning back to the collar 15, the seal between the inner and outer tubes can be any known seal that is employed in telescoping actuators that are air driven to avoid loss of air. Likewise, the means to allow the inner tube 3 to slide in and out of the outer tube 5 can be any known type. An example of such an arrangement would be the use of a bearing at an internal end of the inner tube so there is adequate bearing length when fully extended, with at least 12 inches of the inner tube 3 staying inside the outer tube 5 when extended. The collar 15 is fixed at the end of the outer tube 5 and acts as a bearing, and houses an elastomeric seal within and an optional wiper on the exterior of the collar to prevent debris from being slid into the seal area. In the first embodiment, wherein the inner tube 3 is fixed to the trailer 30, the outer tube 5 would then slide over the inner tube 3. Again, it should be understood that any means that would allow the inner tube to slide with respect to the outer tube for inner tube for extension of retraction of the telescoping tubing assembly and maintain a seal to prevent the air supply from leaking out between the inner tube and outer tube can be employed as part of the invention.

An example of a means to wipe the outer surface of the inner tube 3 in conjunction with the collar 15 is an Equi-Flex Rod Wiper/Scraper, see https://www.zatkoff.com/catalog/ master-catalog/rweqf-equi-flex-rod-wiper-scraper. This wiper/scraper is circular wiping ring made of beryllium copper, an outer portion of the ring encased in a rubber elastomer. The ring can be machined with a high tolerance to have a true ring shape so as to be able to wipe the outside of the inner tube and remove dirt, dust, and the like. It should be understood that other means to wipe the outer surface can be employed, including those associated with the collar or separate therefrom.

The inner and outer tubes can be of any size that an application may require. A preferred size is that the outer tube would be 1¼ inches in outer diameter and the inner tube would be ¾ inches in outer diameter.

The inner and outer tubes can be made of any material that would have the necessary strength to permit the telescoping action as well as be stable when in the inner tube is in the extended state.

While the drawings show that the outer tube 5 or second tube section is connected to the tandem axle trailer and slides over the inner tube 3 or first tube section that is fixed to the trailer when the tandem axle assembly moves from the rear position to the forward position, the reverse configuration can also be utilized. That is, the outer tubes 5 could connect to the air supply lines 23 and 25 and be supported by the trailer and, for example, bracket 19, and the inner tube 3 could be connected to the tandem axle assembly, e.g., by bracket 17. In this configuration, when the tandem axle assembly should move from the rear position to the forward position, the outer tube 5 would remain stationary and the inner tube would move with the axle.

The advantage of the invention is that with pair of the telescoping tubing 10, there is no need for a flexible air supply lines held by spring hangers to accommodate the excess length of air supply lines that would exist when the tandem axle assembly is in the forward position as shown in FIG. 5. Also, since the telescoping tubing assembly 10 is much more robust in its construction, the telescoping tubing assembly would be able to accommodate a number of movements of the tandem axle assemblies with minimum wear and tear.

While the telescoping tubing assemblies are shown with a tandem axle assembly, wherein both axles move, they could also be used with a dual axle assembly, wherein one axle moves with respect to the other axle. In this embodi- ment, the telescoping tubing assemblies could be used to provide the necessary air supply to the moving axle. For purposes of this disclosure, a tandem axle assembly is intended to include an axle assembly where both axles move together as shown in FIGS. 4 and 5 or an axle assembly wherein only one axle moves with respect to the other axle.

Figure 6:
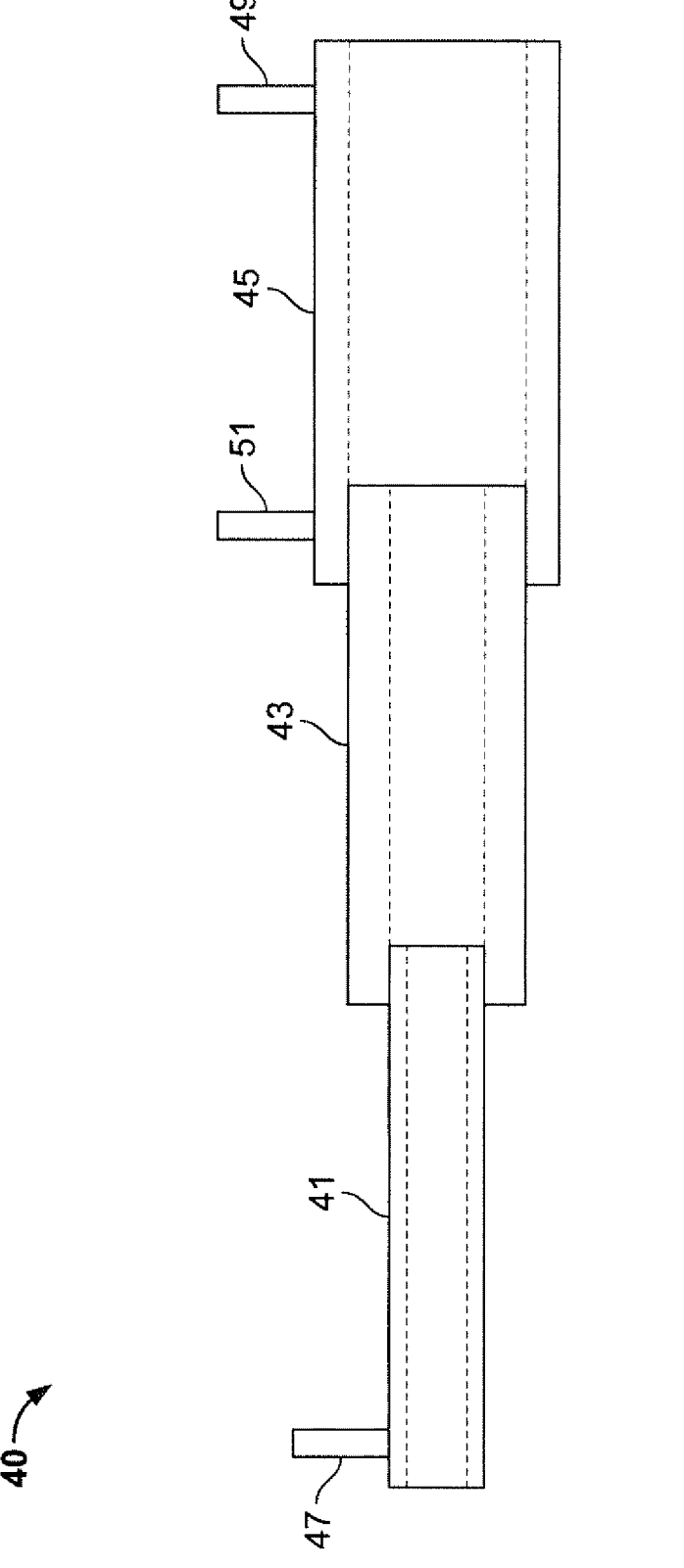
FIG. 6 shows a schematic drawing of a telescoping tube that uses three sections of tubing for extension.

While the telescoping tubing assembly is shown using a pair of telescoping tubes, which is designed primarily for an extension of about 8 feet, there may be a trailer configuration that would require an extension of an axle that exceeds 8 feet. As such, the telescoping tubing may need to use more that two tube sections to achieve an extension that would substantially exceed the exemplified 8 foot extension described above, for example, up to 20 feet. As one example, the telescoping tubing assembly may use three 7-foot sections so that the extension length, accounting for a foot overlap between adjacent tubes when the tubes are in an extended state, would be 19 feet in overall length. An example of such an assembly is shown in FIG. 6, wherein just one of the pair of telescoping tubing is shown. The embodiment is designated by the reference numeral 40 and includes three tube sections, 41, 43, and 45 and brackets 47 and 49, the tube sections shown in the extended state. The brackets 47 and 49 function as described above for the brackets 17 and 19 in the two tube embodiment. That is, the bracket 47 could be attached to the trailer so that the tubes 43 and 45 would move or the bracket 49 could be attached to the trailer so that the tubes 41 and 43 would move. In the event that the tube 45 is attached to the trailer, an additional bracket shown as 51 could be employed and attached to the trailer to add further support to the tubing assembly given the extra weight as a result of having three tube sections and longer distance of extension than the typical 8 feet associ- ated with the embodiments described above. The schematic drawing of FIG. 6 is shown without any couplings or fittings for clarity purposes but such would be included as part of this embodiment consistent with the description above for the embodiments above. The telescoping tubing assembly could also be made of different materials or different sizes to accommodate an extended length of movement to account for the span of unsupported tubing between attachment to the trailer and attachment to the tandem axle assembly and added weight between supported parts of the assembly.

While the tube sections are shown as being round or cylindrical in shape, the sections could have any cross- sectional shape that would still permit the telescoping move- ment, e.g., oval, polygonal, and the like. Preferably, the tubing is cylindrical in shape.

The invention also includes a method of supplying air to air inputs of a moveable tandem axle assembly of a vehicle trailer that involves the steps of providing the inventive air supply assembly for mounting onto a trailer. The telescoping tubes of the assembly are mounted to an underside of the vehicle trailer and the moveable tandem axle assembly, connecting the first end of each telescoping tube to an air supply input of the tandem axle assembly, and connecting the second end of each telescoping tube to an air supply line of the vehicle. The mounting of the telescoping tubes to the underside of the vehicle trailer and moveable tandem axle assembly allows the telescoping tubes to telescope during movement of the moveable tandem axle assembly and still supply air to the moveable tandem axle assembly.

The invention also includes the combination of a trailer having a moveable tandem axle and moveable air supply lines designed to accommodate movement of at least one of the tandem axles and the inventive air supply system mounted to the trailer so that the prior art systems for supporting the air supply lines, e.g., spring hangers, and their problems are eliminated.

I claim:

1. A telescoping tubing assembly for supplying air to a moveable tandem axle assembly of a vehicle trailer com- prising:
   a pair of telescoping tubes, each telescoping tube com- prising at least first and second tube sections connected to each other for telescoping movement;
   means for mounting one of the first or second tube sections to the vehicle trailer and the other of the first or second tube section to the tandem axle assembly;
   each of the first and second ends configured to connect to either an air supply output of the vehicle or an air supply input to the tandem axle assembly; and
   means for preventing air leakage between a connection between of the first and second tube sections and allowing for telescoping movement between of the first and second tube sections; and
   wherein the means for mounting permits the first tube section to retract into the second tube section or extend therefrom with movement of the moveable tandem axle assembly and still maintain the air supply to the move- able tandem axle assembly.

2. The air supply assembly of claim 1, wherein the first tube section is an inner tube of the telescoping tube and the first tube section is configured to connect to an air supply of the vehicle.

3. The air supply assembly of claim 1, wherein the first tube section is an outer tube of the telescoping tube and the first tube section is configured to connect to the air supply output of the vehicle.

4. The air supply assembly of claim 1, wherein the first tube section is an inner tube of the telescoping tube and the means for mounting the inner tube to the vehicle trailer is a bracket connected to both the inner tube and the vehicle trailer to support the inner tube and allow for movement of the second tube section.

5. The air supply assembly of claim 1, wherein the first tube section is an outer tube of the telescoping tube and the means for mounting the outer tube to the vehicle trailer is a bracket connected to both the outer tube and the vehicle trailer to support the outer tube and allow for movement of the second tube section.

6. The air supply assembly of claim 1, wherein first tube section is an inner tube and the second tube section is an outer tube, and the air supply assembly further comprises means for wiping an outer surface of the inner tube during telescoping movement.

7. The air supply assembly of claim 1, comprising at least first, second, and third tube sections for telescoping move- ment.

8. The air supply assembly of claim 1, wherein the first and second tubes sections are cylindrical in shape.

9. A method of mounting an air supply assembly to a vehicle trailer to supply air to air inputs of a moveable tandem axle assembly of a vehicle trailer comprising:
   providing the air supply assembly of claim 1, and
   mounting the telescoping tubes to an underside of the vehicle trailer and the moveable tandem axle assembly, connecting the first end of each telescoping tube to an air supply input of the tandem axle assembly, and connecting the second end of each telescoping tube to an air supply line of the vehicle,
   wherein the mounting of the telescoping tubes to the underside of the vehicle trailer and moveable tandem axle assembly allows the telescoping tubes to telescope during movement of the moveable tandem axle assembly and still supply air to the moveable tandem axle assembly.

10. In a trailer having a moveable tandem axle and moveable air supply lines designed to accommodate movement of at least one of the tandem axles, the improvement comprising the air supply system of claim 1 mounted to the trailer.

\* \* \* \* \*